United States Patent [19]
Gartland

[11] Patent Number: 6,144,974
[45] Date of Patent: Nov. 7, 2000

[54] AUTOMATED LAYOUT OF CONTENT IN A PAGE FRAMEWORK

[75] Inventor: Richard A. Gartland, Bothell, Wash.

[73] Assignee: Adobe Systems Incorporated, San Jose, Calif.

[21] Appl. No.: 08/768,020

[22] Filed: Dec. 13, 1996

[51] Int. Cl.[7] .............................. G06F 17/21; G06F 17/25
[52] U.S. Cl. ......................... 707/517; 707/524; 707/539
[58] Field of Search ..................................... 707/517–525

[56] References Cited

U.S. PATENT DOCUMENTS

| | | | |
|---|---|---|---|
| 4,539,653 | 9/1985 | Bartlett et al. | 364/900 |
| 4,575,813 | 3/1986 | Bartlett et al. | 364/900 |
| 4,723,209 | 2/1988 | Hernandez et al. | 364/300 |
| 4,739,477 | 4/1988 | Barker et al. | 364/300 |
| 4,800,510 | 1/1989 | Vinberg et al. | 345/440 |
| 4,974,174 | 11/1990 | Kleinman | 345/433 |
| 5,003,499 | 3/1991 | Fujiwara et al. | 364/532 |
| 5,031,121 | 7/1991 | Iwai et al. | 364/523 |
| 5,214,755 | 5/1993 | Mason | 707/520 |
| 5,425,138 | 6/1995 | Kumakawa | 395/148 |
| 5,517,621 | 5/1996 | Fukui et al. | 395/148 |
| 5,633,996 | 5/1997 | Hayashi et al. | 395/774 |
| 5,649,216 | 7/1997 | Sieber | 395/767 |
| 5,742,837 | 4/1998 | Fukui et al. | 395/779 |
| 5,796,401 | 8/1998 | Winer | 345/433 |

FOREIGN PATENT DOCUMENTS

| | | |
|---|---|---|
| 0 376 420 A2 | 7/1990 | European Pat. Off. . |
| 0 576 178 A2 | 12/1993 | European Pat. Off. . |
| WO 92/21097 | 11/1992 | WIPO . |

*Primary Examiner*—Stephen S. Hong
*Assistant Examiner*—Robert D Bourque
*Attorney, Agent, or Firm*—Fish & Richardson P.C.

[57] ABSTRACT

A method and apparatus for repositioning a content object on a page in response to a request to change the page framework associated with the page, the method including receiving a user request to change the page framework. The current page framework information associated with the page is retrieved including a description for each framework member in the current page framework. Alignment data for the content object is derived by determining if any edge of the content object aligns with a framework member. Thereafter, the page layout is redefined according to the user request. Finally, the content object is repositioned on the redefined page based on the alignment data.

20 Claims, 5 Drawing Sheets

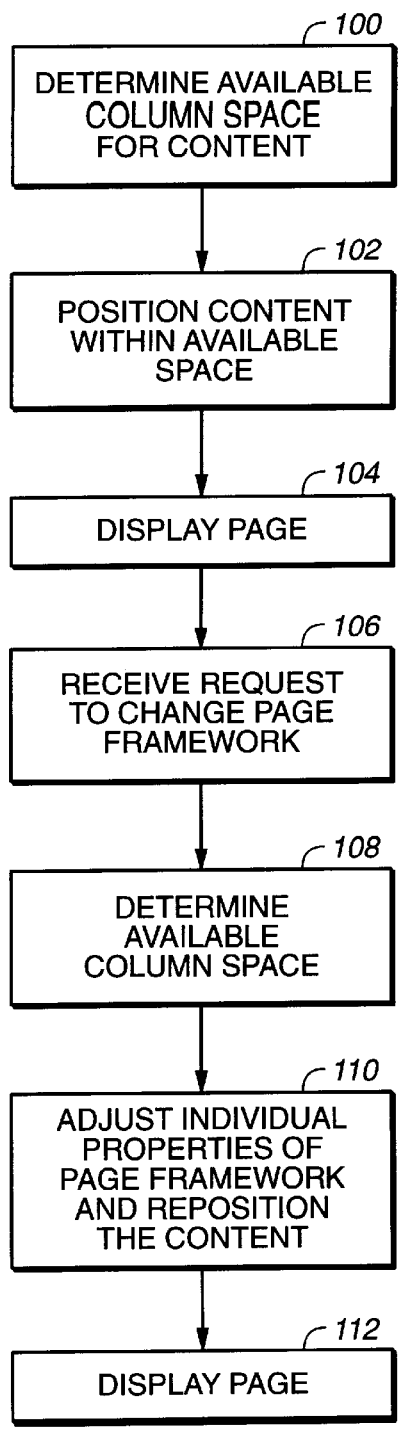
FIG._1
*(PRIOR ART)*
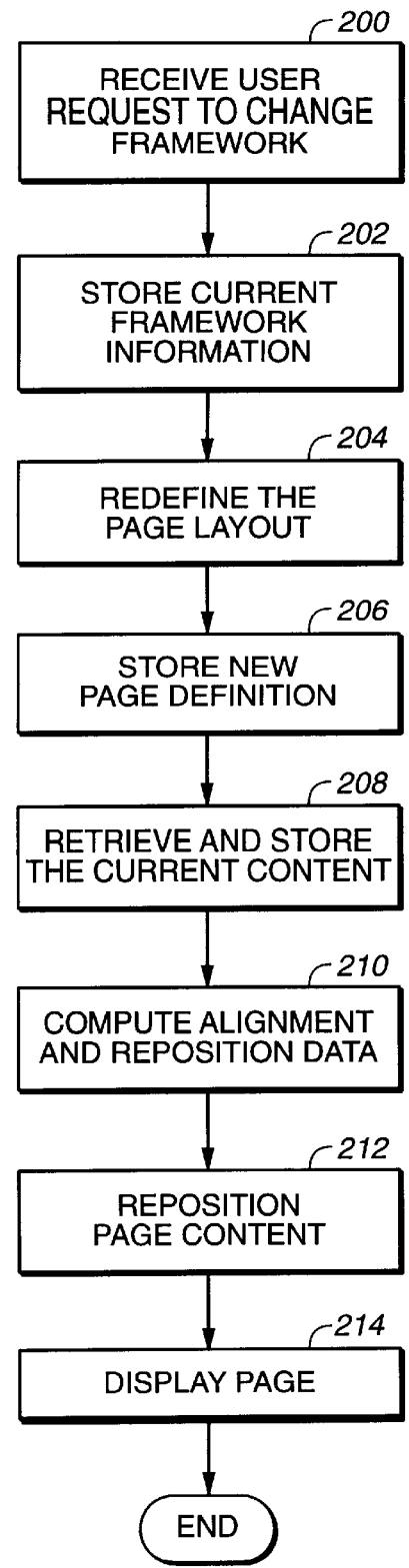
FIG._2

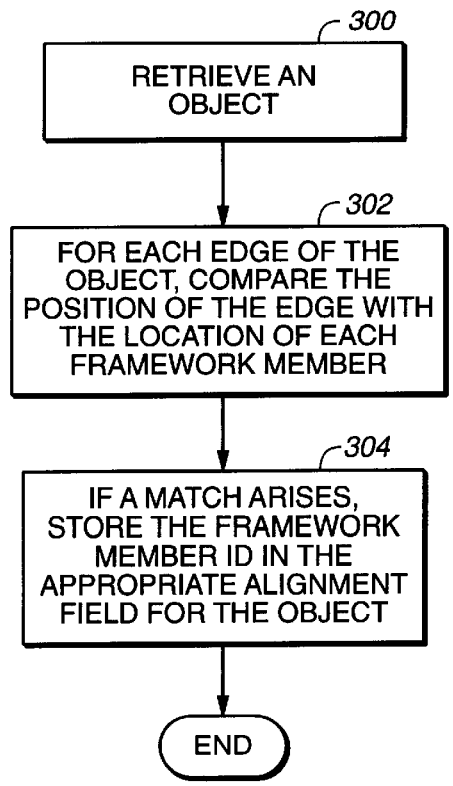
FIG._3
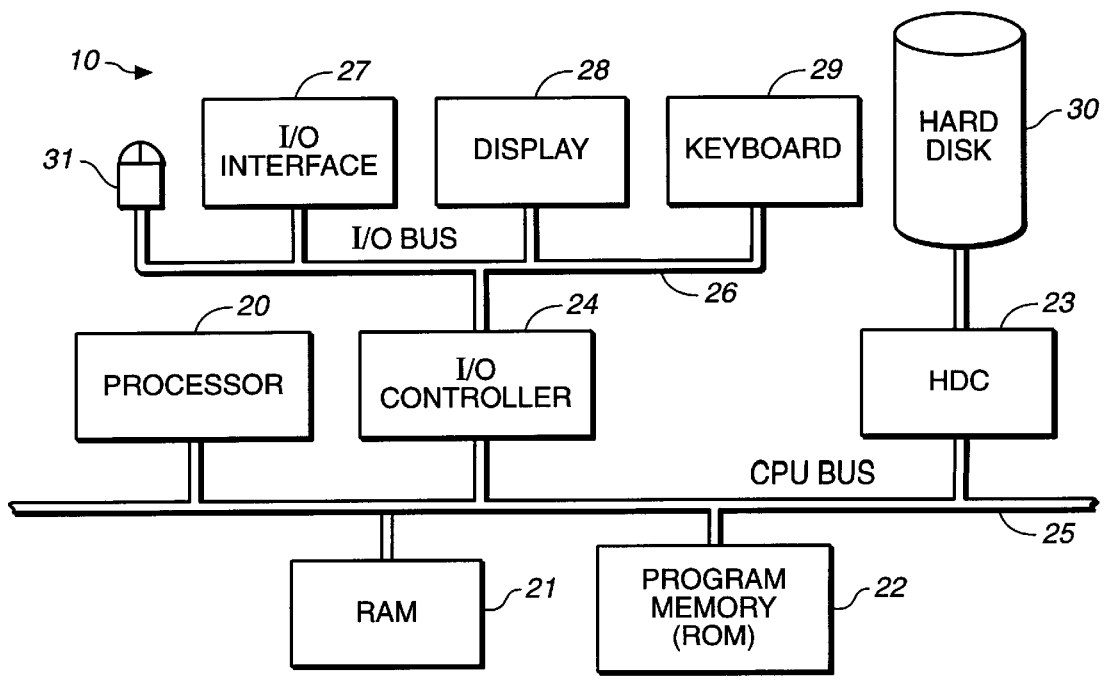
FIG._6

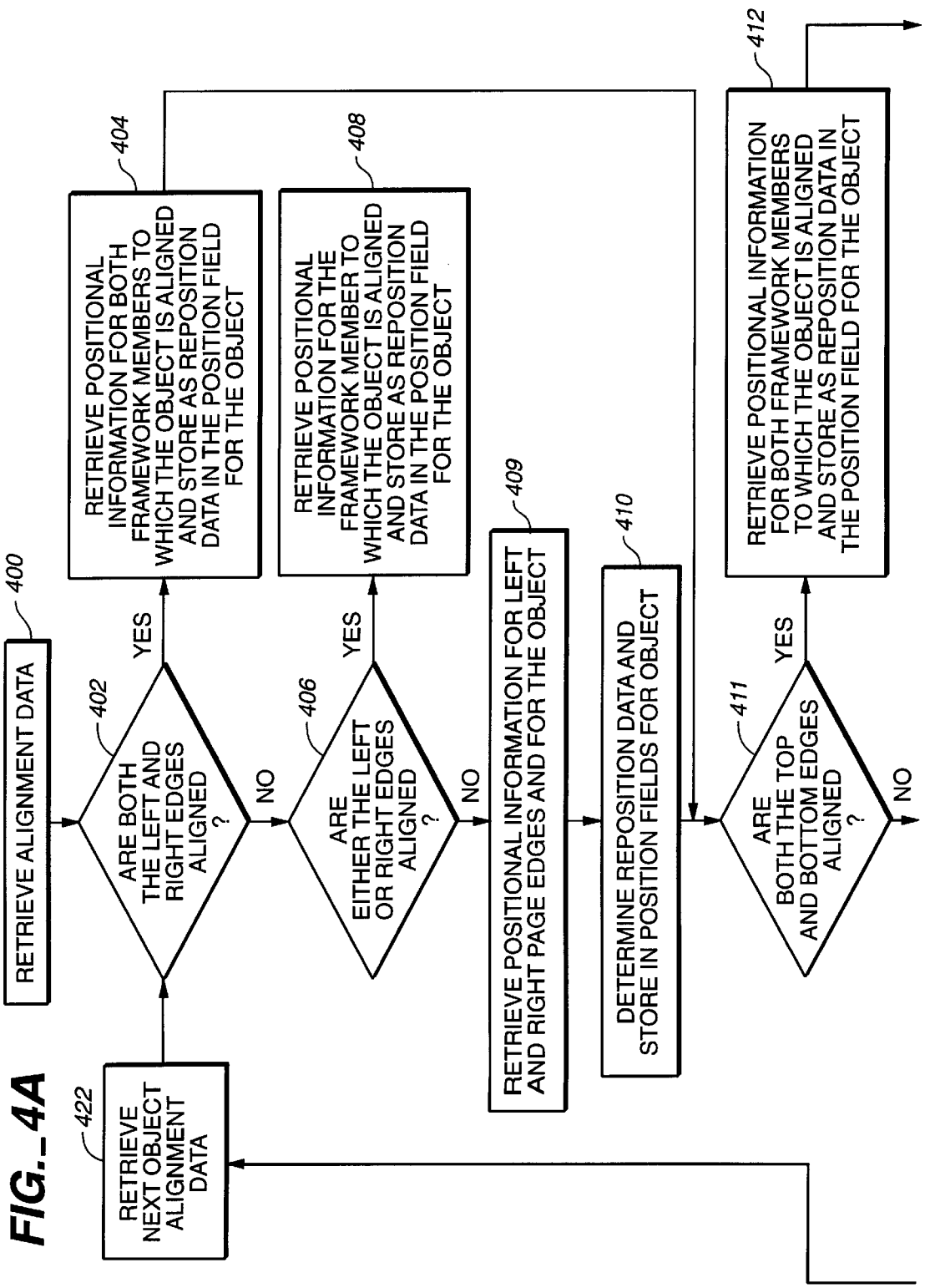
FIG._4A

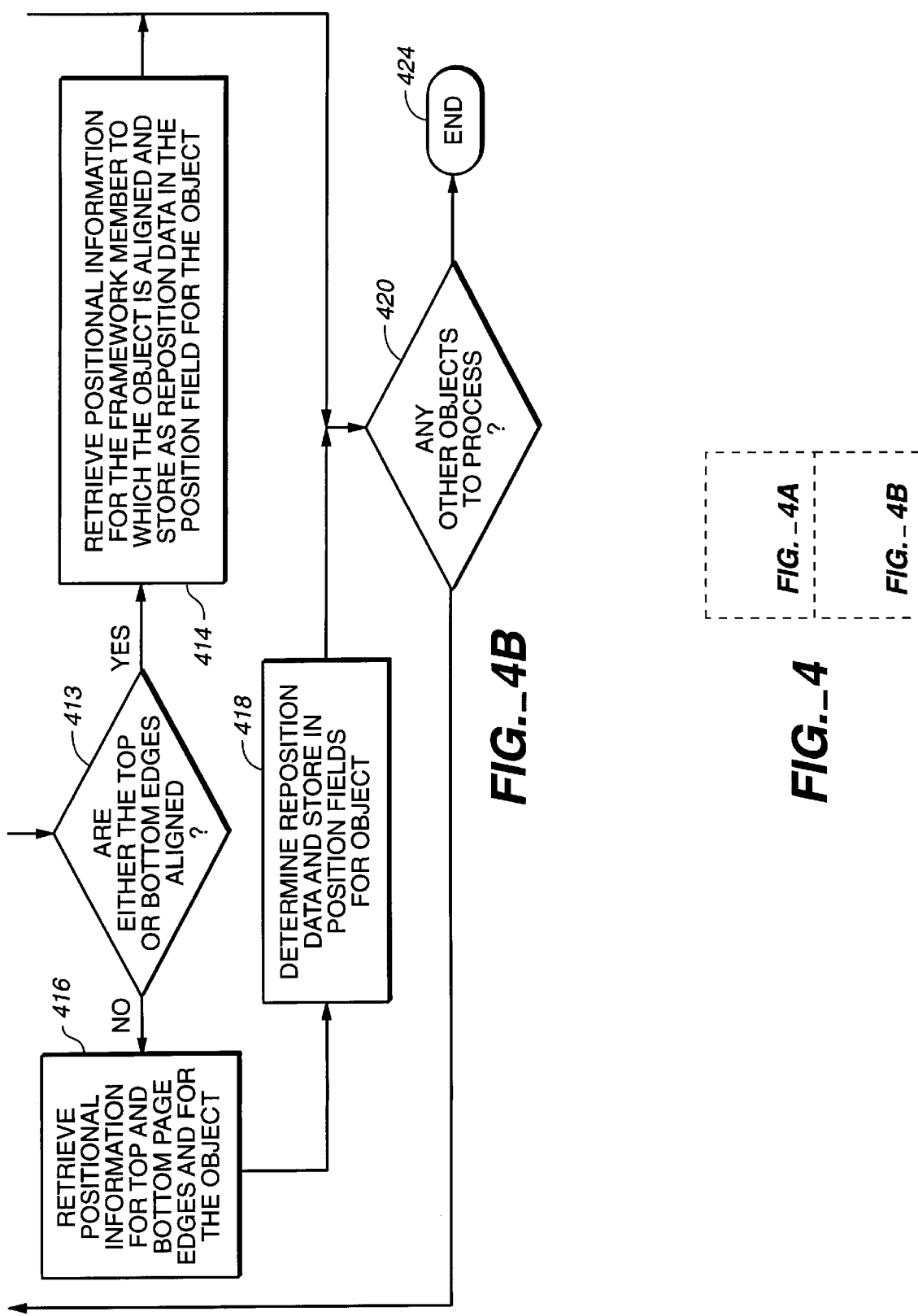

FIG._5

AUTOMATED LAYOUT OF CONTENT IN A PAGE FRAMEWORK

The present invention relates generally to computing systems that include means for displaying documents, and more particularly to an apparatus and method for automatically modifying document layout in a display space.

BACKGROUND

Document publishing software packages may bundle word processing, page design, graphics editing and book building functions into an integrated product for producing documents of various complexities from simple memos to complex multi-chapter documents with imported graphics. One example of such a document publishing software package is PageMaker™ produced by Adobe Systems Incorporated, of San Jose, Calif.

Other document preparation programs or systems provide only word processing functions and limited graphics capabilities. These type of document systems include full function word processors such as Microsoft Word produced by Microsoft Corporation, of Redmond, Wash.

Once produced, documents are often modified from their original format to conform to new or changing user requirements. For example, a document may contain a single column of text, which may have to be converted into two or more columns. In performing such a conversion, the system is required to adjust the layout of the content associated with the various pages of the document to accomplish the user selected changes. One possible effect of a change in format is that it may result in underflow or overflow conditions between pages. An underflow occurs when a layout change results in more space being available on a page to display text, and accordingly, text from a next page must be moved in order to fill the available space. An overflow condition arises when text from one page of the document spills over to another page as a result of the recasting process.

In a document publishing system, the page framework defines how content is organized and displayed on a given page of a document. The page framework includes members which are used to position, align or otherwise organize the content on the page. The members include margins, page edges, ruler guides, and column edges. Page properties such as page size and orientation (portrait or landscape) affect the location of framework members on the page. Accordingly, when modifications to a page property are made by the user, the document publishing system is required to adjust the associated framework members to their new locations. Any content associated with (or aligned to) one of these relocated frame members must be similarly relocated in the new page layout or the user will be required to manually perform the adjustment.

FIG. 1 shows a typical word processor approach to displaying content on a page. A word processor program determines the available column space in the page framework for content based on the position of framework members as based on user selected (or default) page properties of the page framework (100). The content (e.g., words typed by the user) is positioned automatically within the available column area (102). Thereafter, the page may be displayed (104). Upon receipt of a request to change the page framework (in the form of a change to a page property or the repositioning of an individual framework member) (106), the program determines the available column space for the content based on the new page framework (108). Thereafter, the program adjusts the page framework members and repositions the content within the available space (110). Finally, the new page may be displayed (112). This process repeats at step 104 each time a page framework member or page property is adjusted by the user. For example, to make the content area narrower on the page, the user is required to widen the left and/or right margins. Arbitrary positioning of content—especially multiple pieces of content such as an assortment of text and graphic objects—is impossible.

Other document publishing systems allow for more freedom in the placement of content on a page. Such systems typically treat content as objects. For example, PageMaker allows a user to place content (either text or graphics) arbitrarily on a page. The user sizes the objects and thereafter positions them on the page at arbitrary locations. This approach allows complete flexibility of layout for the page, giving such systems superiority over word processor programs for situations where design freedom is important.

While this type of freedom is desirable, difficulties arise when the page framework is altered. Typically, free form document publishing systems that allow for the arbitrary placement of content on a page are unable to recast content automatically on a page in response to a change in the page framework. Accordingly, content must be resized or repositioned manually after changes are made to the page framework. In these free form document publishing systems, alignment of content to framework members is considered entirely coincidental and no notice is taken of them by the program when acting on user instructions to modify the page framework.

SUMMARY OF THE INVENTION

In general, in one aspect, the invention provides a method for repositioning a content object on a page in response to a request to change the page framework associated with the page including receiving a user request to change the page framework. The original page framework information associated with the page is retrieved including a description for each framework member in the original page framework. Alignment data for the content object is derived by determining if any edge of the content object aligns with a framework member. Thereafter, the page layout is redefined according to the user request. Finally, the content object is repositioned on the redefined page based on the alignment data.

Preferred embodiments include the following features. The user request changes the position of a framework member. The framework member changed by the user is selected from the group consisting of margins, column edges, page edges, and ruler guides. Deriving alignment data includes retrieving positional information for the content object, determining if an object edge aligns with any framework members and, if so, selecting one framework member from the set of framework members to which the object edge aligns to be the framework member to which the edge of the object is to be aligned in the redefined page. If an object edge aligns to more than one framework member, the framework member to which the edge of the object is to be aligned in the redefined page is selected according to a predetermined order. The predetermined order is alignment to columns, ruler guides, margins, page edges, and bleed edges.

Alignment to a framework members is precise. Redefining the page layout includes repositioning of ruler guides.

Repositioning the content object includes retrieving the alignment data for the object, aligning the object horizontally on the page and aligning the object vertically on the page.

Horizontal alignment includes determining if left and right edges of the object align to framework members. If both edges align to framework members, then the object is moved and resized so that the objects left and right edges match the new locations of the framework members to which they align in the redefined page layout. If only one edge of the object is aligned to a framework member, then the object is moved horizontally without resizing to a new position associated with the framework member to which it is aligned. If neither edge aligns, the object is moved horizontally without resizing so as to keep its center in the same relative position on the page.

Vertical alignment includes determining if top and bottom edges of the object align to framework members. If both align to framework members, then the object is moved and resized so that the objects top and bottom edges match the new locations of the framework members to which they align in the redefined page layout. If only one edge of the object is aligned to a framework member, then the object is moved vertically without resizing to a new position associated with the framework member to which it is aligned. If neither edge aligns, the object is moved vertically without resizing so as to keep its center in the same relative position on the page.

Among the advantages of the invention are the following. Content may be placed on a page for display arbitrarily, but the placement on the page will result in an inference of structure. As changes to the page framework are indicated by a user, an inferred structure allows for the automatic recasting of the page content based on the inferred structure.

Other advantages and features will be apparent from the following description and claims.

BRIEF DESCRIPTION OF THE DRAWINGS

FIG. 1 is a flow diagram for a process of displaying a page of a document by a prior art word processing application.

FIG. 2 is a flow diagram of a process for automatically adjusting content of a page in a document publishing system in response to a user selected change to a page framework member according to one embodiment of the present invention.

FIG. 3 is a flow diagram for determining alignment data according to one embodiment of the present invention.

FIG. 4 is a flow diagram for determining reposition data according to one embodiment of the present invention.

FIG. 5 is a table showing the repositioning of a content object based on various combinations of alignments of the edges of the object to framework members according to one embodiment of the present invention.

FIG. 6 is a schematic block diagram of a programmable computer suitable for executing computer programs according to the present invention.

DETAILED DESCRIPTION

Referring to FIG. 2, in a process of automatically adjusting content in a document, the document publishing system receives a user request to change the page framework associated with a given page of a document (200). The user request may be of the form of a page property change (such as a change to the page size) or may specify a change to a particular framework member that is to be relocated. The user request defines the changes required for the framework members to conform the page display to the user's desired output format. For instance, if the user wishes to change the orientation of the document from "Tall" to "Wide", then the position of the margins and columns will change. In one embodiment, the following user actions can result in framework modifications: changes to page size or orientation, margins, number of columns or the space between columns; changes to the attributes of the current master page (where changes to the master page affect each other page in the document, e.g., its columns or margins); or the assignment of a different master page to the current page.

The document publishing system takes a snapshot (stores) of the current (original) page framework information associated with the given page of the document (202). This requires the retrieval of the various page settings (page framework) that have been either explicitly set by the user or the default settings (as appropriate for the document publishing system). In one embodiment, the page framework settings retrieved are page size (e.g., letter, legal, A4, for determining page edges), page orientation (tall or wide, also for determining page edges), margin width for each of the four margins (top, bottom, right, left), general column information (how many columns, how much space between columns), specific column information (position of each column's left and right side), and the position of ruler guides. A ruler guide is a vertical or horizontal non-printing straight line used to assist in content (object) alignment. In one embodiment, the page settings information is stored as positional information and includes the exact position of each page framework member defined for an associated page.

In one embodiment, the page framework is divided into two groups, horizontal and vertical members, as follows:

| Horizontal members | Vertical members |
| --- | --- |
| top and bottom page edges | left and right page edges |
| top and bottom margins | left and right margins |
| horizontal ruler guides | vertical ruler guides |
| bleed edges | left and right column edges |
| | bleed edges |

The data structure for representing and storing a framework member includes a position field for storing each member's absolute position on the page and a type field for storing the type of framework member.

After the original framework page information has been stored, the system redefines the page layout according to the user request received in step 200 (204). More specifically, the system adjusts the page to conform to the new user requested page configuration, which may include a change of page size, margin location, or column size or position. Accordingly, each page framework member may be relocated to a new position on the page, or removed from the page entirely. The new page definition, in the form of page framework members, is stored for use in manipulating content objects on the redefined page (206). The data structure for storing the framework members in the redefined page includes a position field and type field.

After the page framework information has been stored, the current content for the page is retrieved and stored (208). The type and coordinates of each content object on the page (e.g., textblock, box, oval, polygon, line, graphic, group) are gathered, in a manner that stores the coordinates of each side (edge) (left, top, right, bottom) of the object's bounding box. The data structure for a content object includes position fields for storing the coordinates for each edge of the object and alignment fields for storing alignment data. Alignment fields and alignment data will be discussed in greater detail below in reference to FIGS. 3 and 4. In the case of a textblock, some additional information is gathered, related to whether the textblock is threaded before and/or after other textblocks in the document.

It is important to note that these objects can be placed anywhere on the page (even extending partially off the page), regardless of the page framework. That is, objects do not need to be positioned on the framework. The system gives complete freedom to the user in positioning each object; they can even overlap. Margins, columns, and ruler guides are provided merely as a convenience to allow for alignment to the framework as desired.

After the current content for the page has been retrieved, the system computes alignment and reposition data for each content object (210). More specifically, alignment data is derived for each object by inferring alignment to framework members. Thereafter, each content object is evaluated along with the alignment data to determine (based on its edge alignments to framework members) reposition data for defining how the object should be moved and/or resized to fit on the modified (redefined) framework. The process of computing alignment and reposition data is described in greater detail in reference to FIGS. 3 and 4.

After the page redefinition has been completed, the page content is repositioned on the redefined page based on the reposition data derived in step 210 (212). Thereafter the redefined page is displayed (214).

Alignment and reposition data is computed based on inferred relationships between the content objects and page framework members in the original page layout. Referring to FIG. 3, the process of computing alignment data includes retrieving an object (300). As described above, the data structure for each object includes positional information for locating each edge of the object in display space (on the page). For each edge, alignment data is derived based on the alignment of the given edge to framework members by comparing object edge position for alignment with a framework member (302). Alignment data for each edge of an object is computed by comparing the relative position of a respective edge with each framework member. The goal is to determine whether each of the object's four edges are precisely aligned to members of the page framework. For each edge of a given object, the framework members to which alignment may be inferred are stored as alignment data in alignment fields associated with each object (304). More specifically, alignment data is stored in the alignment fields for each object and includes the identifier of the framework member to which the object is aligned in the original (prior to redefinition) page.

In one embodiment, alignment checks are performed in a hierarchical fashion, such that alignment checks for each edge terminate at the identification of the first framework member to which the edge aligns. The order of the alignment checks (hierarchy) is as follows: columns, ruler guides, margins, page edges, and finally, and off-page (bleed) edges. A bleed edge is any object edge which bleeds off the edge of the document.

Alternatively, alignment data associated for all of the framework members that are aligned to a given object edge may be stored. If multiple alignments (framework members) are stored, a more complex scheme of structure inference may be implemented. However, the accuracy of these "complex" inferences made by the automatic repositioning system may decrease. A more complex scheme may result in inferences that are not correct for a given application, and thus require user interaction to correct. Accordingly, a hierarchical system that allows for a higher degree of certainty and less complex inferences is preferred.

In one embodiment, alignment to a framework member is determined to within a default tolerance or user defined tolerance level. For example, since the coordinate values used in making edge-to-framework comparisons can be very precise (some systems support positioning to $\frac{1}{1440}$ of an inch), it is possible that an object was meant by the user to be aligned to a framework member, when in fact it slightly missed it. For this reason, the user may select a "snap-to-zone" feature to match objects that are close to a framework member but not perfectly aligned. The snap-to-zone distance is defined as the distance on either side of a framework member within which an object edge will be considered to be matched (aligned) to that framework member. In one embodiment, the default value for the snap-to-zone distance is 0.014 inches.

Referring now to FIG. 4, the process of computing reposition data for relocating content objects on the redefined page includes retrieving the alignment data for a first object (400). A check is made to determine if both the left and right edges of the object align to framework members (402). If so, then, it is inferred that the object should remain fitted to both of the framework members to which it is aligned. This inference is stored in the form of reposition data. Reposition data is positional information which defines the location of each edge for the content object on the redefined page. Reposition data is stored in the position fields for each object. Accordingly, the positional information associated with each of the framework members to which the object aligns is retrieved and stored in the appropriate position fields for the given object (404). Thus, at the time for repositioning the object, the reposition data stored in the positional fields will result in the relocation of the edges (left and right) of the object to the new locations of these members in the redefined page. This may result in the object being moved and/or resized horizontally.

If the object is not aligned on both its right and left edges, then a check is made to determine if either the left or right edge of the object is aligned to a framework member (406). If so, then it is inferred that the object should move with the single member to which it is aligned, but not be resized horizontally. Accordingly, the positional information associated with the framework member to which the object aligns is retrieved and stored in the appropriate position field for the given object (408). At the time for repositioning, the object is moved (horizontally) in relation to the new position of the framework member to which it is aligned.

If the left and right edges of the object do not align to any framework member, it is inferred that the object should maintain its same relative position on the page (horizontally). Accordingly, positional information for the object on the original page and the left and right page edges for the original and new page definitions are retrieved (409). The reposition data (relative location of the object on the redefined page) is determined and stored in the appropriate position field for the given object (410). At the time for repositioning, the object is moved horizontally (but not resized) so as to keep its center in the same relative position on the page as it previously had before the user redefined the page.

Next, a check is made to determine if both the top and bottom edges of the object align to framework members (411). If so, then it is inferred that the object should remain fitted to both of the framework members to which it is aligned. This inference again is stored in the form of reposition data. Accordingly, the positional information associated with each of the framework members to which the object aligns is retrieved and stored in the appropriate position fields for the given object (412). Thus, at the time for repositioning the object, the reposition data stored in the positional fields will result in the relocation of the top and bottom edges of the object to the new locations of these members in the redefined page. This may result in the object being moved and/or resized vertically.

If the object is not aligned on both its top and bottom edges, then a check is made to determine if either the top or bottom edge of the object is aligned to a framework member (413). If so, then it is inferred that the object should move with the single member to which it is aligned, but not be resized vertically. Accordingly, the positional information associated with the framework member to which the object aligns is retrieved and stored in the appropriate position field for the given object (414). At the time for repositioning, the object is moved (vertically) in relation to the new position of the framework member to which it is aligned.

If the top and bottom edges of the object do not align to any framework member, it is inferred that the object should maintain its same relative position on the page (vertically). Accordingly, positional information for the object on the original page and the top and bottom page edges for the original and new page definitions are retrieved (416). The reposition data (relative location of the object on the redefined page) is determined and stored in the appropriate position field for the given object (418). At the time for repositioning, the object is moved vertically (but not resized) so as to keep its center in the same relative position on the page as it previously had before the user redefined the page.

A check is made to determine if more objects are required to be repositioned on the page (420). If so, then the alignment data for the next object is loaded (422), and the process continues at step (402). Otherwise, the process ends and the reposition data for each object is made available to allow for the repositioning of the content objects on the redefined page.

The above rules treat horizontal edges independently from vertical ones. That is, an object may have no alignments on the left or right edges, and hence is moved to the right or left to maintain its center's relative page position. At the same time, however, the top or the bottom (or both) may have been aligned to the framework. In this case, the object is also adjusted vertically, according to the rules presented above. This means that depending on the types of alignments on the four edges of an object, the action taken on it might be to move in one dimension but to move and resize in the other. A table 500 showing the various possible combinations of alignments and the resultant repositioning of an object is shown in FIG. 5.

While the process is most easily described and understood in terms of a sequence of checks, other means of determining the repositioning can be employed. Specifically, a lookup could be performed against a table of alignments to determine the repositioning of a given object based on the individual combination of alignments for each edge. Alternatively, a tree search can be performed. Alternatively, the process can be implemented as rules interpreted or executed by a rule-based inference engine. In one embodiment, an Eclipse engine produced by The Haley Enterprise, Inc., of Sewickley, Pen. was used.

In an alternative embodiment, objects that are groups, or are or contain graphics, are repositioned so as not to harm their overall visual appearance. Accordingly, any resizing made in accordance with FIG. 3 is done proportionally. That is, the resizing factor is kept the same in both horizontal and vertical dimensions. In this particular embodiment, proportional resizing acts as an override to the normal repositioning set forth above. That is, if an object is resized due to horizontal alignments, then the same resizing factor is applied vertically, even if no vertical alignments were present. This can cause alignments to be lost if all four edges were originally aligned and the amount of resizing is not the same in each dimension. When this happens, the system will try to fit the left and right edges to their proper framework members first, then the top, and then the bottom if possible. If doing the resizings in this order would make the object too large for the page, then the system will reverse the order and resize according to the top and bottom edge alignment criteria first.

In another embodiment, the redefinition of the page as is described in association with step 204 of FIG. 2 includes changing or moving additional framework members that would not necessarily be required to be changed based on the change data. The resizing of a page may require the movement of ruler guides, an additional framework member, in order to redefine the page layout in a manner that is consistent with user requirements. For example, it may be inferred that a ruler guide placed by a user at a margin location should also be moved if the margin itself is repositioned. Accordingly, in one embodiment, changes to framework members will result in the automatic repositioning of ruler guides according to two specific rules. First, any ruler guide that is superimposed on a column edge or a margin will be moved along with that column edge or margin. The system infers that if the user went to the trouble of aligning the ruler guide to such a location, then it is desirable to reposition the guide to the new location of that framework member. Second, any other ruler guides (ones not positioned at a column edge or margin) will be repositioned on the page to retain their relative position on the page. That is, a vertical guide halfway across the page will end up halfway across the page after switching from "Tall" to "Wide" for the page layout, for example.

In one embodiment, the repositioning of the ruler guides is user controllable. That is, the user may designate the default rules described above for controlling the repositioning of ruler guides in accordance with change data, or alternatively may disable the automatic repositioning of ruler guides. If the user has chosen to disable the automatic repositioning of ruler guides, and this results in a guide ending up off the page (such as a case of a horizontal guide in the top margin area, when switching from "Tall" to "Wide"), then that ruler guide is removed, and any object edge previously associated with it will match to any remaining framework members occupying the same original position on the page.

In another embodiment, the determination of alignment includes two additional considerations. If an object has a left or right edge aligned to the right margin and that right margin is also the right side of the last column on the page, ordinarily that object would be deemed aligned with the column edge instead of the margin. However, in this alternative embodiment, the object's right edge is only associated with the right side of the column if the object's left edge is also associated with that column's left side. That is, the object is only thought to belong to the column if both edges match the column edges. Otherwise, the right edge is associated with the right margin. This allows objects aligned on both sides with the column to remain associated with the column, but other objects to align to the margin. This is useful in the case of an object that spans the left and right margins of the page.

In addition, if the left edge of an object is aligned to the right margin and that right margin is also the right side of the last column on the page, ordinarily that object would be deemed aligned with the column edge instead of the margin. However, in an alternative embodiment, this left edge of the object is aligned with the margin, not the column. This prevents objects that are in the right margin area with a left edge aligned to the right margin from ending up inside the column portion of the page when new columns are added to the page. Without this special rule, the object would stay associated with the column, effectively making it move to the left when the page is changed to add columns.

In another embodiment, textblocks (a particular type of content object for textual information) are handled specially when columns are added or subtracted to a page. If the original page contains columns that include textblocks, and the last textblock ends at the bottom of the right-most column on the page, then upon the addition or subtraction of columns from the page layout, the text associated with each textblock will be reflowed to stream into the new column configuration. Consider a page originally containing three columns, each including textblocks, with the user changing the number of columns to four. According to the rules of FIG. 3, the three textblocks would each be moved and resized to the new coordinates of columns one through three, resulting in text in each column, with the text reflowed to fit in the space available, with any overflow text being stored off the page. The new fourth column would be empty, which presumably is not what the user would have wanted. Therefore, in this embodiment, a new textblock for column four is created for the text content that was "flowed out" of the first three columns when they became narrower on the page.

When removing columns from a page, other considerations must be included. Specifically, the relationship of the content (text) in any textblock that is proposed to be removed must be examined relative to the remaining text on a page. In our example above, if a three column page is to be transformed into two columns (by the removal of column three), the textblock associated with the third column may or may not be removed during the repositioning step. Where the text in the textblock that is associated with the column to be removed (i.e., column three) is threaded to other text that remains on the page, then the system will remove a textblock whose column has also been removed. Threading is the process of linking associated textblocks. For textblocks that have text that is not threaded, the removal of the column does not result in the removal of the textblock, and the user must reposition the textblock manually.

In another embodiment, the repositioning of bleed members is handled specially. Bleed members are objects that have one or more edges (bleed edges) off the page. In one embodiment, bleed edges for bleed members are always maintained a fixed distance from their adjacent page edge irrespective of the other alignment rules described above. That is, if a bleed edge is 1 inch from the right side of the page and the page width changes, then that bleed edge (and the accompanying bleed member) is repositioned to be 1 inch from the new right side of the page.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, FIG. 6 shows a block diagram of a programmable information processing system (computer) 10. Computer 10 preferably includes a processor 20, random access memory (RAM) 21, a program memory 22 (preferably a writable read-only memory (ROM) such as a flash ROM), a hard drive controller 23 and an input/output (I/O) controller 24 coupled by a CPU bus 25.

Hard drive controller 23 is coupled to a hard disk 30, which may be used for storing application programs, such as PageMaker, and data. I/O controller 24 is coupled by means of an I/O bus 26 to an I/O interface 27. I/O interface 27 receives and transmits data in analog or digital form over communication links such as a serial link, local area network, wireless link, and parallel link. Also coupled to I/O bus 26 is a display 28, a keyboard 29 and a pointing device (mouse) 31. Alternatively, separate connections (separate buses) may be used for I/O interface 27, display 28, keyboard 29 and pointing device 30. Programmable processing system 10 may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory 22 or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The present invention has been described in terms of specific embodiments, which are illustrative of the invention and not to be construed as limiting. Other embodiments are within the scope of the following claims.

What is claimed is:

1. A method for positioning a content object on a page of an electronic document, the page having a page framework, the method comprising:

receiving a user request to change the page framework, the page framework having one or more framework members defined on the page, the page having a content object having a position on the page, the position being defined independent of any framework member of the page framework, the request not establishing any relationship linking the content object to any framework member;

in response to the user request, inferring an alignment of the content object to at least one of the framework members based on the position of the content object relative to the positions of the framework members on the page at the time of the user request without regard to any previously defined or inferred alignment of the content object to any framework members;

redefining the page framework members according to the user request; and repositioning the content object on the page with reference to the redefined page framework according to the inferred alignment.

2. The method of claim 1 wherein the user request changes the position of a framework member and where the framework member changed by the user is selected from a group consisting of page margin, page edge, column edge and ruler guide.

3. The method of claim 1 where inferring an alignment of the content object to at least one of the framework members includes:

retrieving positional information associated with the content object, the content object having one or more edges, each edge being defined independent of any framework members; and inferring if any edge of the content object aligns with a framework member based on the position of the edge of the content object relative to the position of the framework member on the page at the time of the user request, and, if so, selecting one framework member from the set of framework members to which the edge of the content object aligns to be the framework member to which the edge of the content object is to be aligned in the redefined page framework.

4. The method of claim 3 where if the edge of the content object aligns to more than one framework member, the framework member to which the edge of the content object is to be aligned in the redefined page framework is selected according to a predetermined order.

5. The method of claim 4 wherein the predetermined order is alignment to columns, ruler guides, margins, page edges, and bleed edges.

6. The method of claim 3 where the edge of the content object is inferred to align to the framework member only if the position of the edge of the content object is the same as the position of the framework member.

7. The method of claim 1 wherein redefining the page framework members includes repositioning ruler guides by evaluating each ruler guide to determine if the ruler guide is superimposed with a margin or column edge that is to be repositioned according to the user request, and if the ruler guide is superimposed on such a margin or column edge then repositioning the ruler guide to maintain its position relative to the changed margin or column edge.

8. The method of claim 7 further including repositioning a ruler guide that is not superimposed on a margin or column edge to maintain its position in the redefined page framework relative to its position occupied in the page framework at the time of the user request.

9. The method of claim 1 wherein the step of repositioning the content object includes:

aligning the content object horizontally on the page according to the inferred alignment; and aligning the content object vertically on the page according to the inferred alignment.

10. The method of claim 9 where the horizontal alignment step further comprises:

inferring if left and right edges of the content object align to framework members, if both edges align to framework members, then moving and resizing the content object so that the positions of the left and right edges of the content object are the same as the new locations of the framework members to which both edges align in the redefined page, if only one edge of the content object is aligned to a framework member, then moving the content object horizontally so that the position of the edge of the content object is the same as the position of the framework member to which it is aligned without resizing the content object, and if neither edge of the content object aligns to a framework member, then moving the content object horizontally so as to keep a center of the content object in the same relative position on the page without resizing the content object.

11. The method of claim 9 where the vertical alignment step further comprises:

inferring if top and bottom edges of the content object align to framework members, if both edges align to framework members, then moving and resizing the content object so that the positions of the top and bottom edges of the content object are the same as the new locations of the framework members to which both edges align in the redefined page, if only one edge of the content object is aligned to a framework member, then moving the content object vertically so that the position of the edge of the content object is the same as the position of the framework member to which it is aligned without resizing the content object, and if neither edge of the content object aligns to a framework member, then moving the content object vertically so as to keep a center of the content object in the same relative position on the page without resizing the content object.

12. The method of claim 1 wherein the step of repositioning the content object includes:

aligning the content object on the page according to the inferred alignment.

13. The method of claim 12 where the alignment step comprises:

inferring if left and right edges of the content object align to framework members, if both edges align to framework members, then moving and resizing the content object so that the positions of the left and right edges of the content object are the same as the new locations of the framework members to which both edges align in the redefined page, if only one edge of the content object is aligned to a framework member, then moving the content object horizontally so that the position of the edge of the content object is the same as the position of the framework member to which it is aligned without resizing the content object, and if neither edge of the content object aligns to a framework member, then moving the content object horizontally so as to keep a center of the content object in the same relative position on the page without resizing the content object; and inferring if top and bottom edges of the content object align to framework members, if both edges align to framework members, then moving and resizing the content object so that the positions of the top and bottom edges of the content object are the same as the new locations of the framework members to which both edges align in the redefined page, if only one edge of the content object is aligned to a framework member, then moving the content object vertically so that the position of the edge of the content object is the same as the position of the framework member to which it is aligned without resizing the content object, and if neither edge of the content object aligns to a framework member, then moving the content object vertically so as to keep a center of the content object in the same relative position on the page without resizing the content object.

14. The method of claim 13 where a content object that includes a group or graphics is reositioned with proportional resizing overriding repositioning normally conducted in accordance with the alignment step.

15. The method of claim 1 where the repositioning is performed by a look-up operation where the inferred alignment is indexed in an alignment table to map an individual pattern of edge alignment with a resultant move and resize operation to be performed on the content object.

16. The method of claim 1 where a content object that includes a group of graphics is repositioned with proportional resizing overriding repositioning normally conducted in accordance with the repositioning step.

17. The method of claim 1 wherein a content object that includes a bleed edge is repositioned to maintain its relative fixed distance from an adjacent edge on the document.

18. A computer program, tangibly stored on a computer-readable medium, for positioning a content object on a page of an electronic document, the page having a page framework having one or more framework members defined on the page, the page having a content object having a position on the page, the position being defined independent of any framework member of the page framework, the program comprising instructions operable for causing a computer to:

infer an alignment of a content object to at least one of the framework members, without regard to any previously defined or inferred alignment of the content object to any framework members, based on the position of the content object relative to the positions of the framework members on the page at the time of a user request to change the page framework, the request not establish any relationship linking the content object to any framework member;

redefine the page framework according to the user request; and reposition the content object on the page with reference to the redefined page framework according to the inferred alignment.

19. A method for positioning content objects on a page of an electronic document, the page having a page framework, the method comprising:

receiving a user request to change the page framework, the page framework having one or more framework members defined on the page, the page having content objects, each content object having a position on the page, each position being defined independent of any framework member of the page framework, the request not establishing any relationship linking the content object to any framework member;

in response to the user request, inferring an alignment of each content object to at least one of the framework members based on the position of the content object relative to the positions of the framework members on the page at the time of the user request without regard to any previously defined or inferred alignment of the content object to any framework members;

redefining the page framework members according to the user request; and repositioning the content objects on the page with reference to the redefined page framework according to the inferred alignment for each content object.

20. The method of claim 19 wherein the step of repositioning the content objects includes:

aligning each content object horizontally on the page according to the inferred alignment for each content object by inferring if left and right edges of each content object align to framework members, if both edges align to framework members, then moving and resizing the content object so that the positions of the left and right edges of the content object are the same as the new locations of the framework members to which both edges align in the redefined page, if only one edge of the content object is aligned to a framework member, then moving the content object horizontally so that the position of the edge of the content object is the same as the position of the framework member to which it is aligned without resizing the content object, if neither edge of the content object aligns to a framework member, then moving the content object horizontally so as to keep a center of the content object in the same relative position on the page without resizing the content object; and inferring if top and bottom edges of each content object align to framework members, if both edges align to framework members, then moving and resizing the content object so that the positions of the top and bottom edges of the content object are the same as the new locations of the framework members to which both edges align in the redefined page, if only one edge of the content object is aligned to a framework member, then moving the content object vertically so that the position of the edge of the content object is the same as the position of the framework member to which it is aligned without resizing the content object, if neither edge of the content object aligns to a framework member, then moving the content object vertically so as to keep a center of the content object in the same relative position on the page without resizing the content object.

* * * * *